United States Patent [19]

Grosman

[11] Patent Number: 5,445,112
[45] Date of Patent: Aug. 29, 1995

[54] TERRARIUM COVER
[75] Inventor: Bert Grosman, Allentown, Pa.
[73] Assignee: Novalek, Inc., Hayward, Calif.
[21] Appl. No.: 283,731
[22] Filed: Aug. 1, 1994

Related U.S. Application Data

[63] Continuation-in-part of Ser. No. 209,144, Mar. 9, 1994.
[51] Int. Cl.⁶ .............................................. A01K 63/00
[52] U.S. Cl. ................................. 119/265; 119/246; 220/315; 229/120
[58] Field of Search ............... 119/265, 266, 15, 6.5, 119/19, 246; 229/120, 120.1; 220/315, 324, 367

[56] References Cited

U.S. PATENT DOCUMENTS

| 296,853 | 4/1884 | Ledig . | |
|---|---|---|---|
| 3,283,743 | 11/1966 | Dibelius . | |
| 3,524,431 | 8/1970 | Graham et al. | 229/120.1 |
| 3,786,781 | 1/1974 | Poulsen . | |
| 3,804,064 | 4/1974 | Kuneman et al. . | |
| 4,086,876 | 5/1978 | Moore et al. . | |
| 4,147,131 | 4/1979 | Walker . | |
| 4,176,620 | 12/1979 | Kassos . | |
| 4,204,499 | 5/1980 | Leyva et al. . | |
| 4,576,115 | 3/1986 | Gordon | 119/265 |
| 4,754,571 | 7/1988 | Riechmann . | |
| 4,787,336 | 11/1988 | Lineberry . | |
| 5,161,269 | 11/1992 | McLean et al. | 5/414 |
| 5,161,478 | 11/1992 | Strieb | 114/361 |
| 5,183,004 | 2/1993 | Trent et al. . | |
| 5,218,930 | 6/1993 | Casmira | 119/165 |
| 5,241,977 | 9/1993 | Flores et al. | 135/88 |

*Primary Examiner*—Todd E. Manahan
*Attorney, Agent, or Firm*—Harris Zimmerman

[57] ABSTRACT

A cover arrangement for a tank used as a terrarium or aquarium includes hook and loop fastener material secured as a continuous strip to the upper rim surface of the tank opening, as well as to the upper side surfaces adjacent to the rim. The cover includes a mesh portion to enclose the tank opening, and a frame dimensioned to be secured to the rim of the tank. The frame includes a continuous strip of hook and loop material secured about the perimeter of the mesh portion and disposed to engage the hook and loop material on the upper rim of the tank. In addition, a plurality of tabs extend from the frame, one for each side of the tank. Each tab includes hook and loop material, and is joined to the cover frame along a respective crease line to be folded and matingly engaged at the upper side surfaces adjacent to the rim.

6 Claims, 8 Drawing Sheets

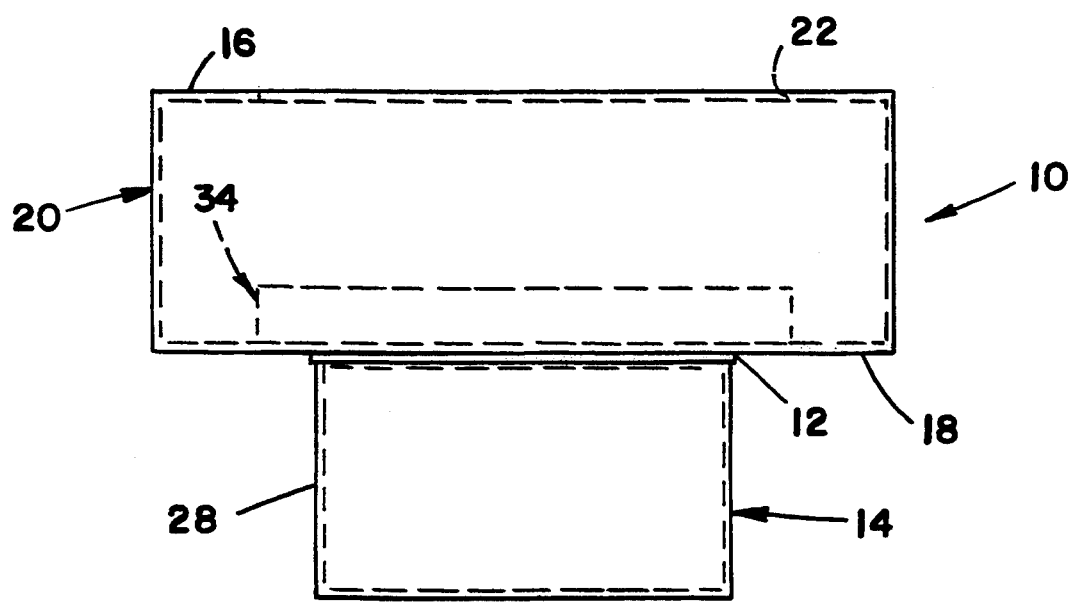
FIG_1
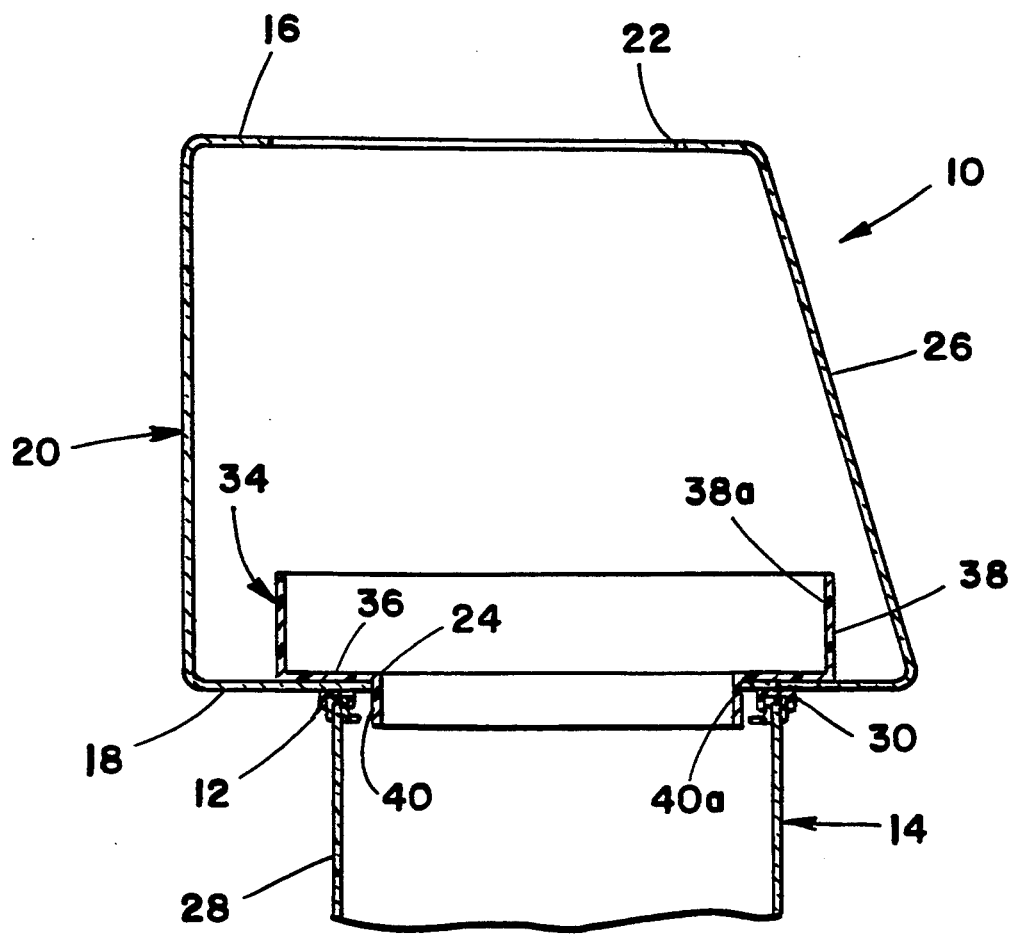
FIG_5

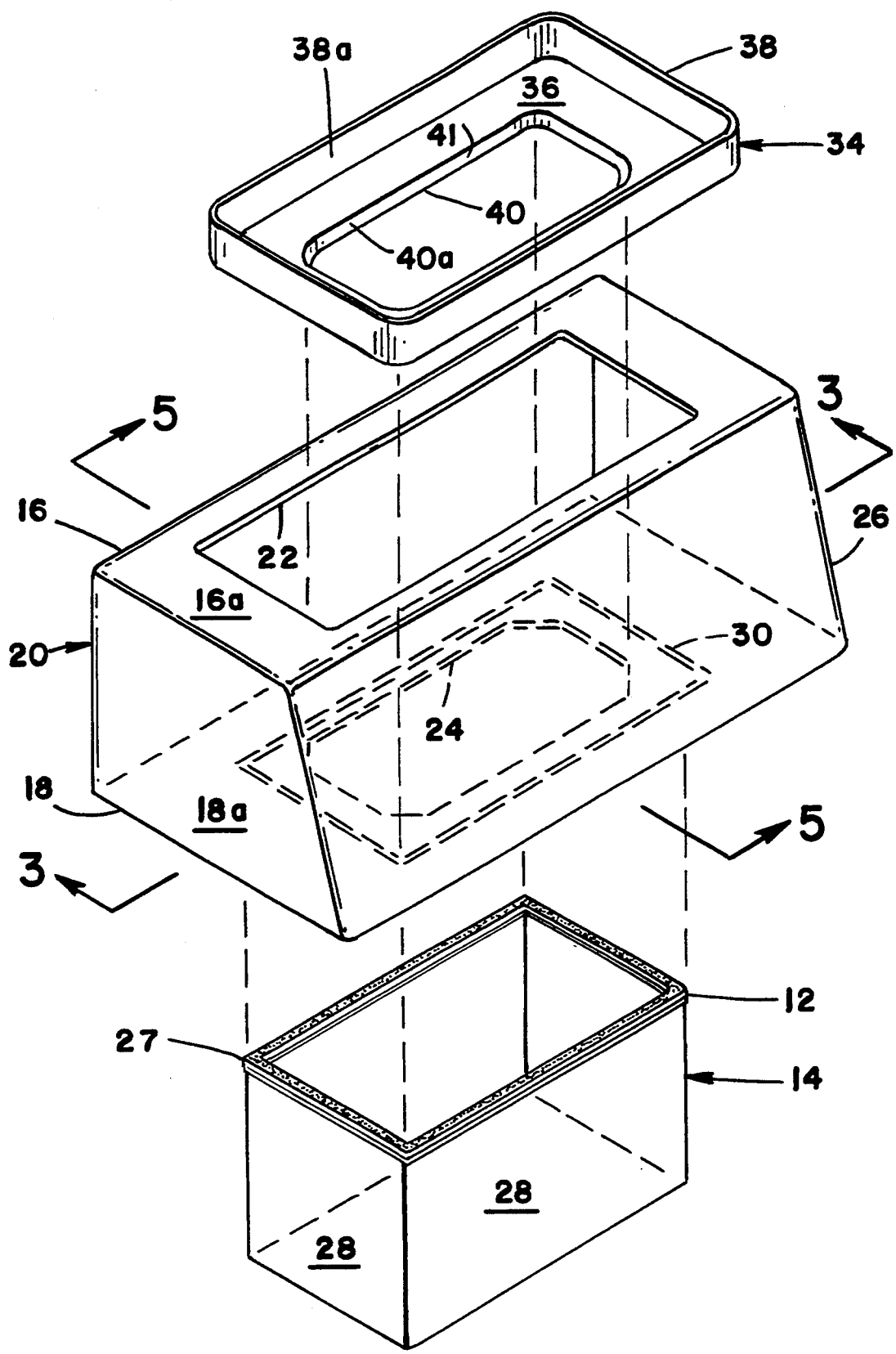
FIG_2

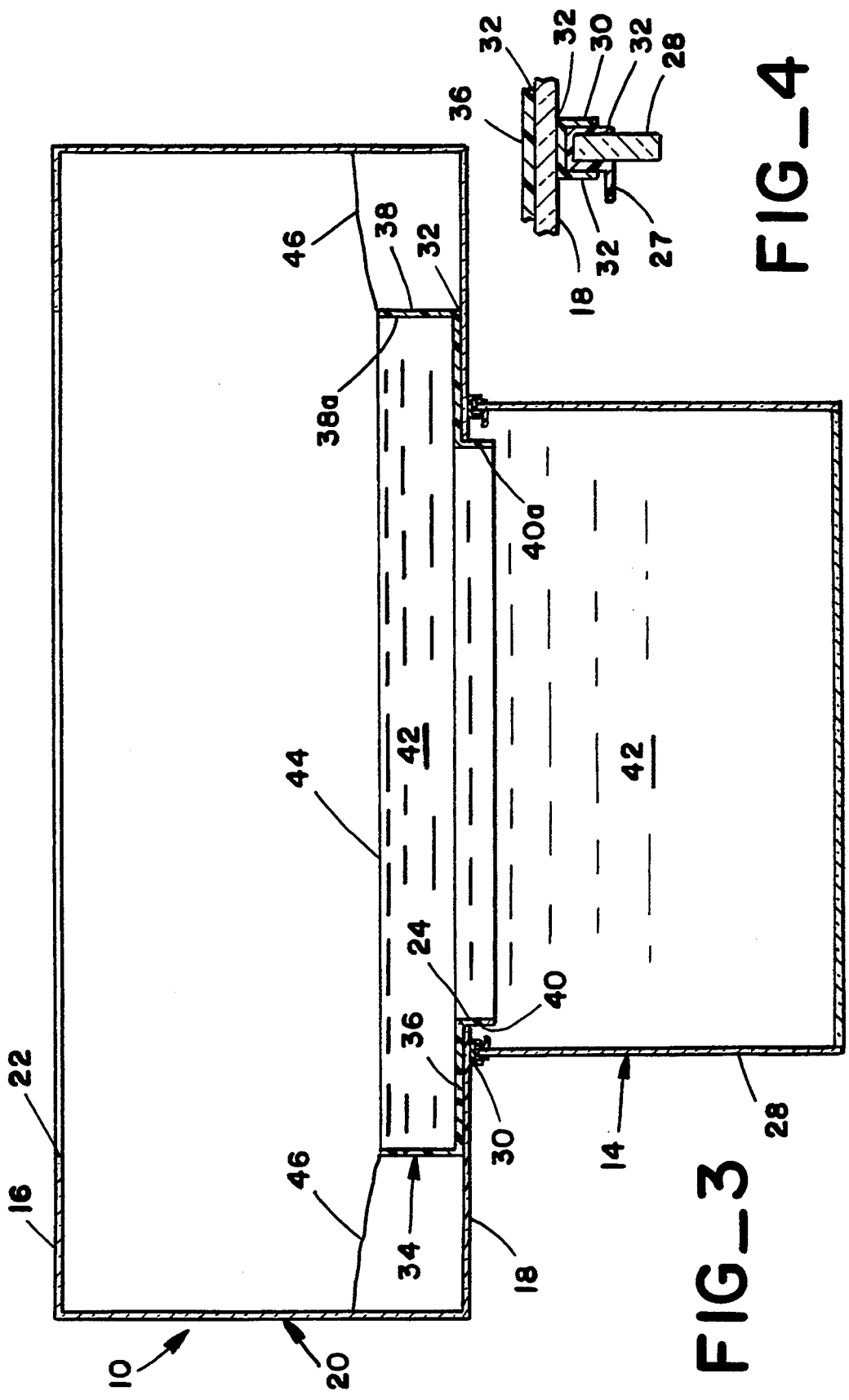

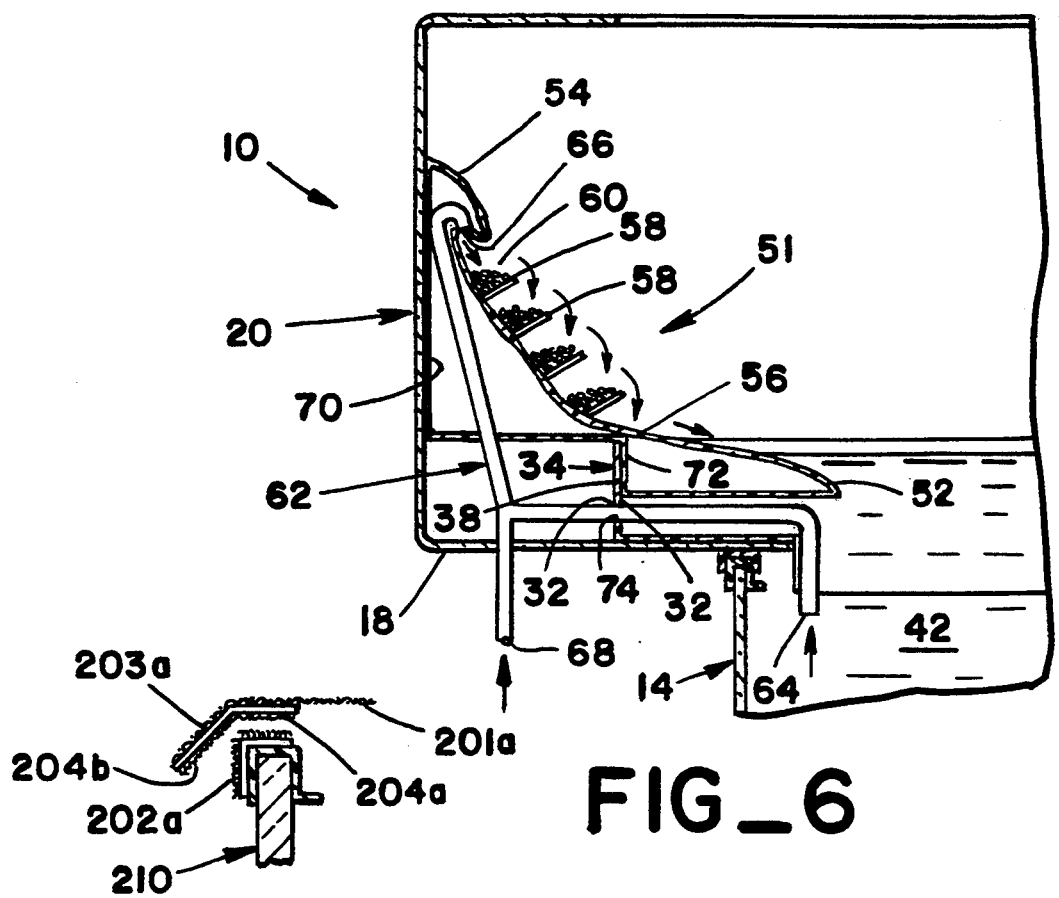
FIG_6
FIG_7A
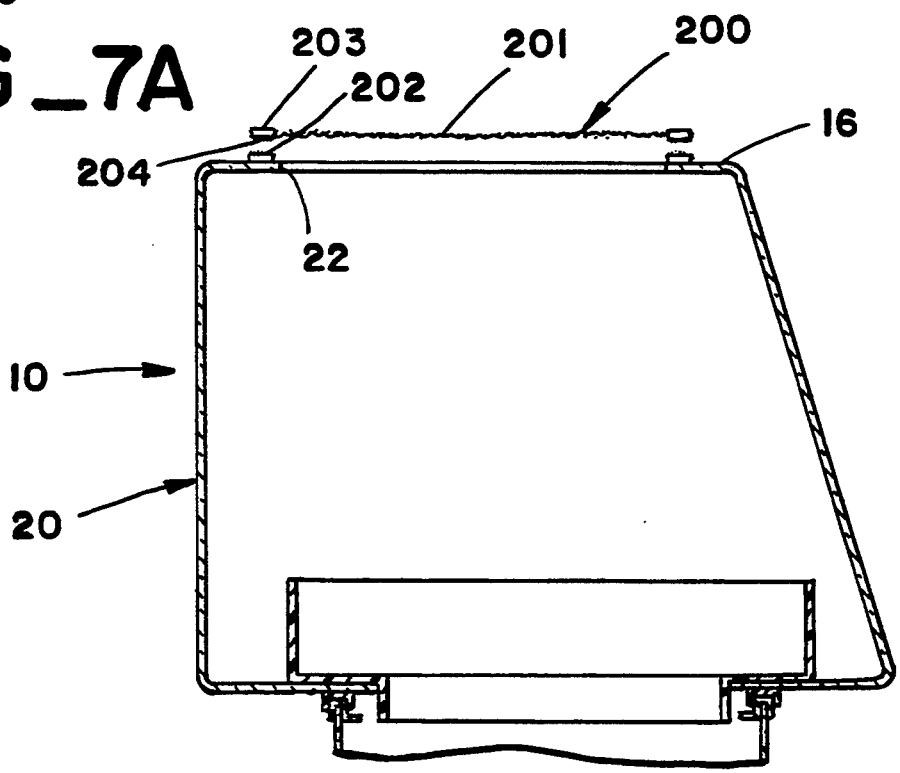
FIG_7

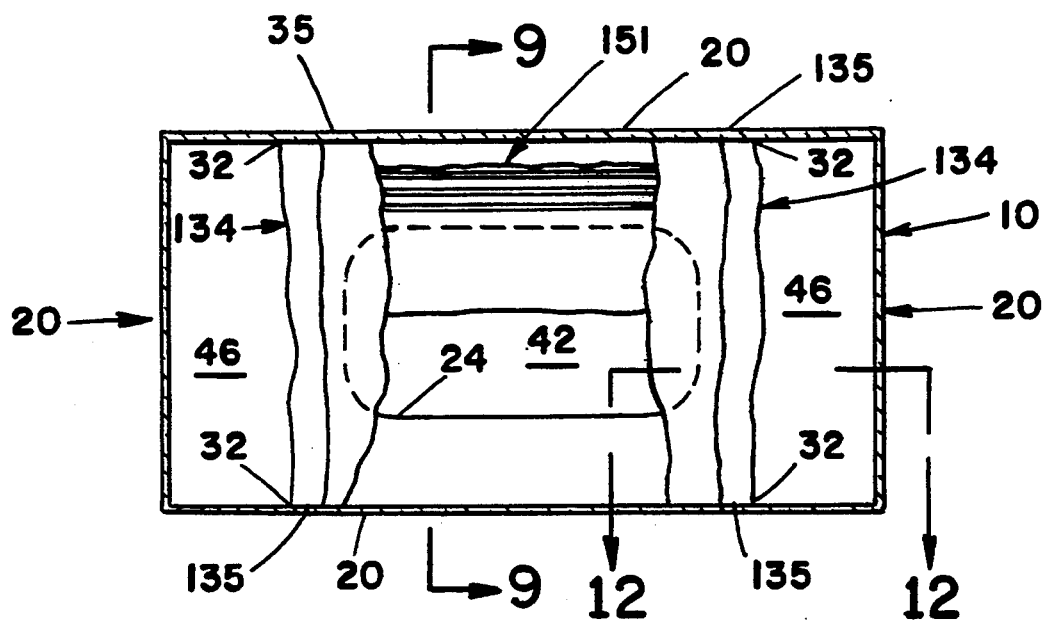
FIG_8
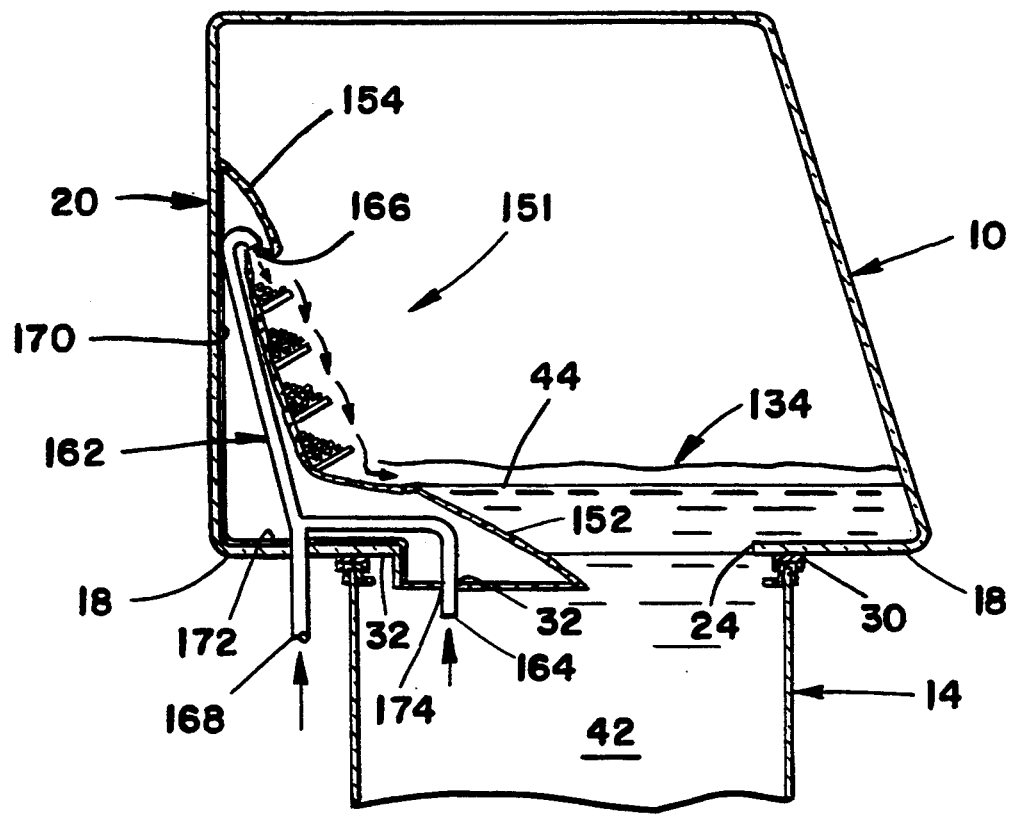
FIG_9

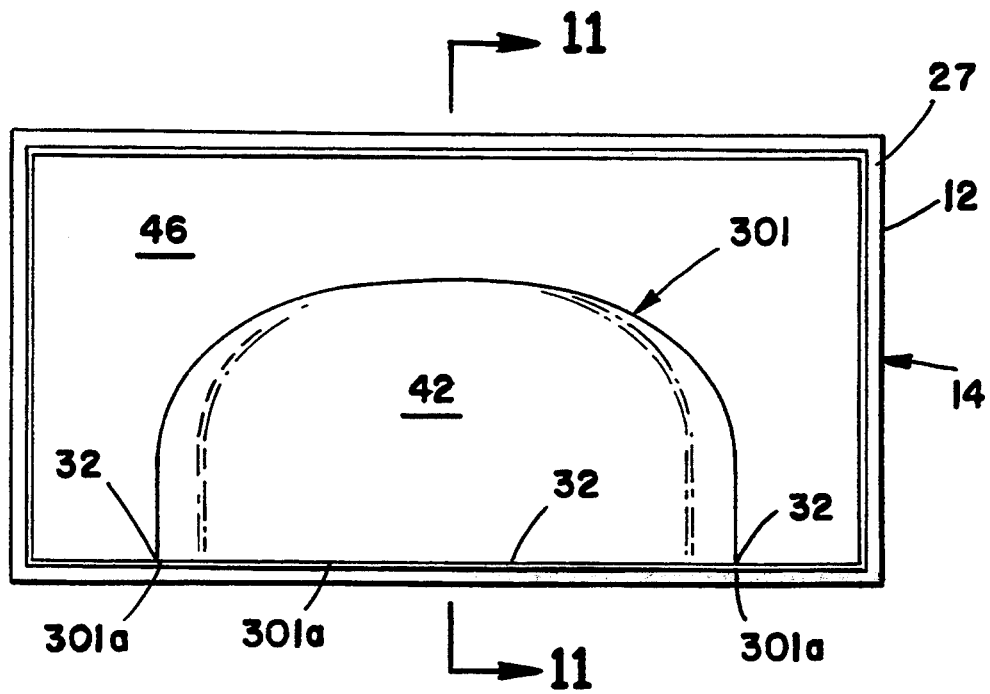
FIG_10
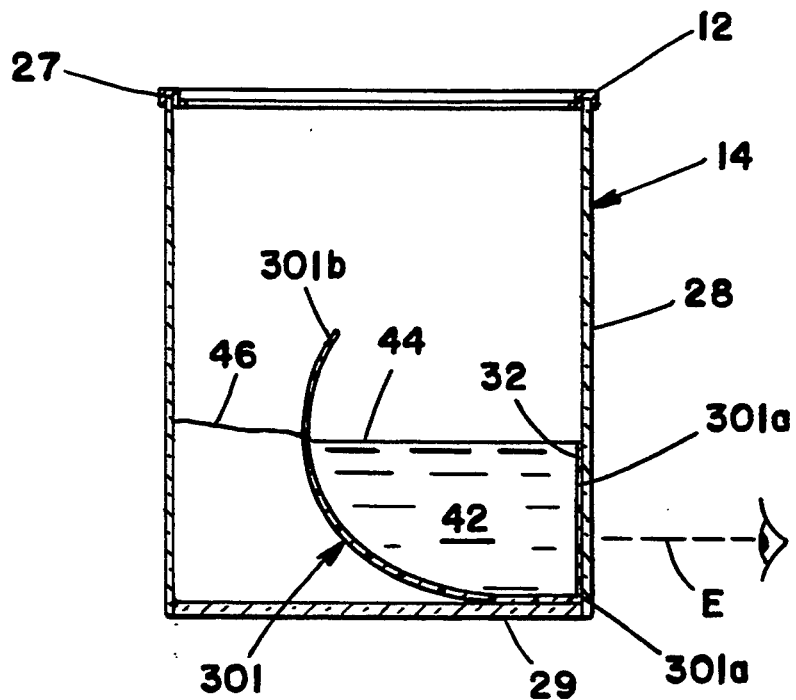
FIG_11

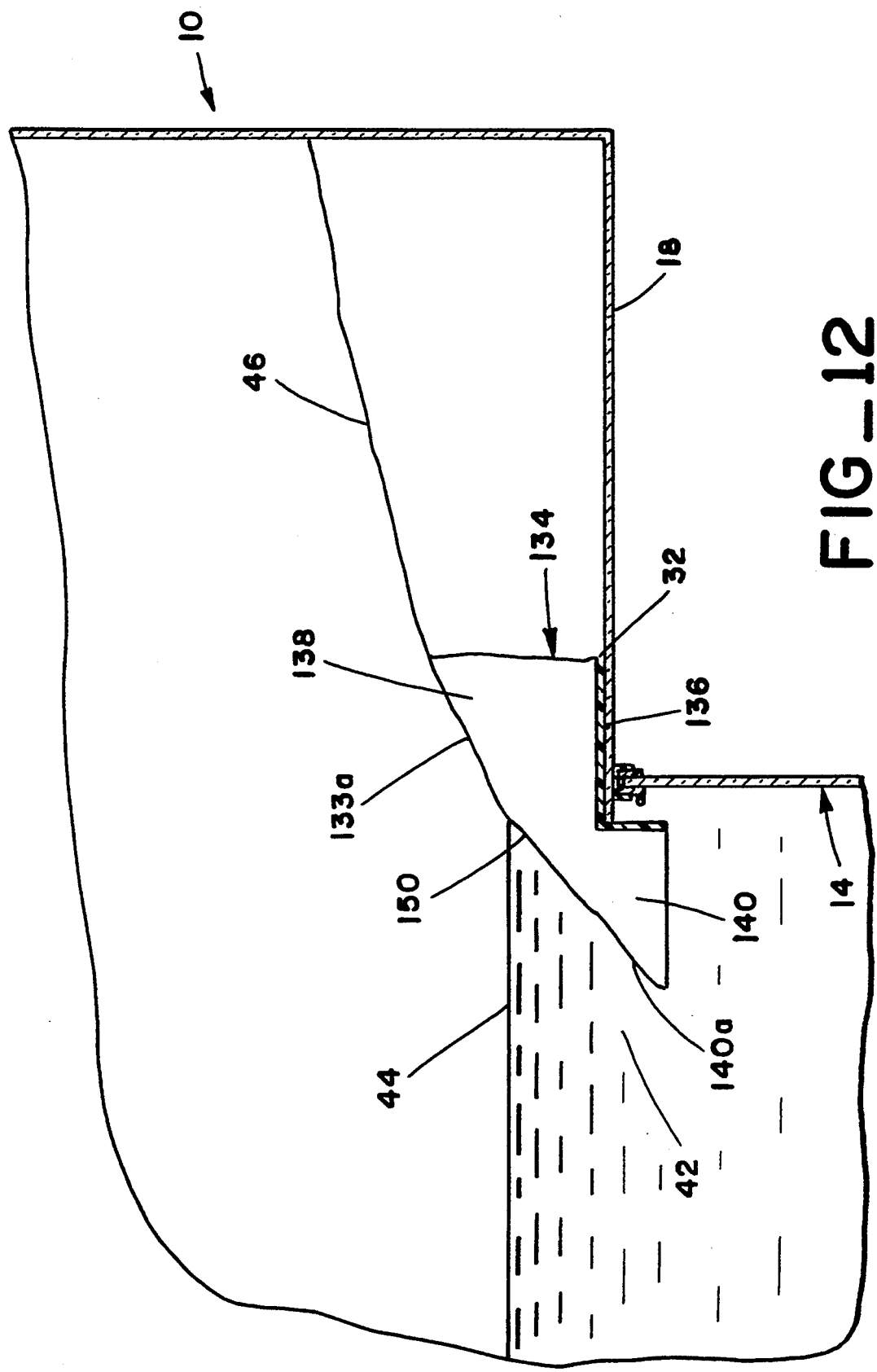
FIG_12

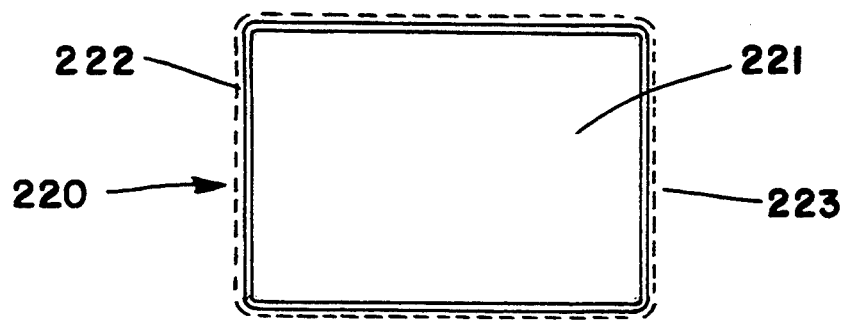
FIG_13
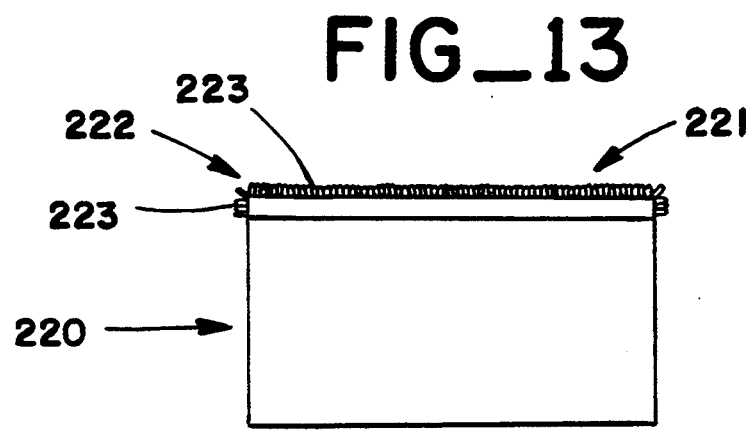
FIG_14
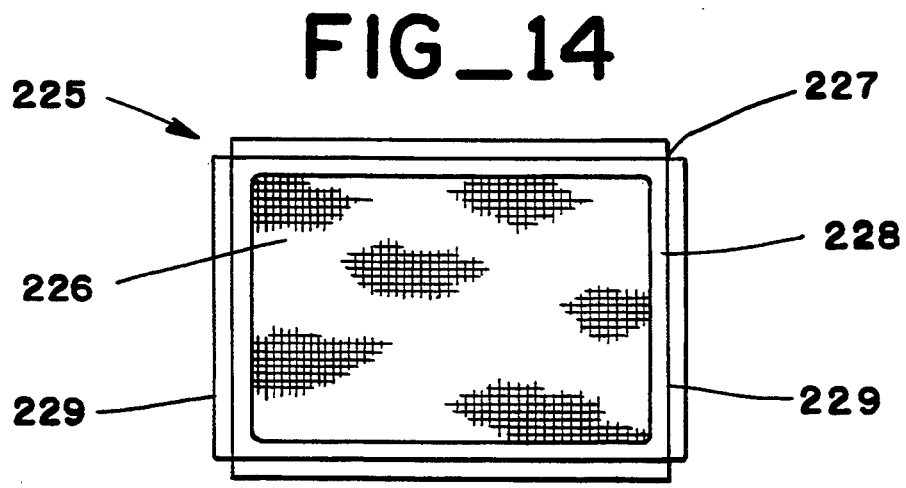
FIG_15
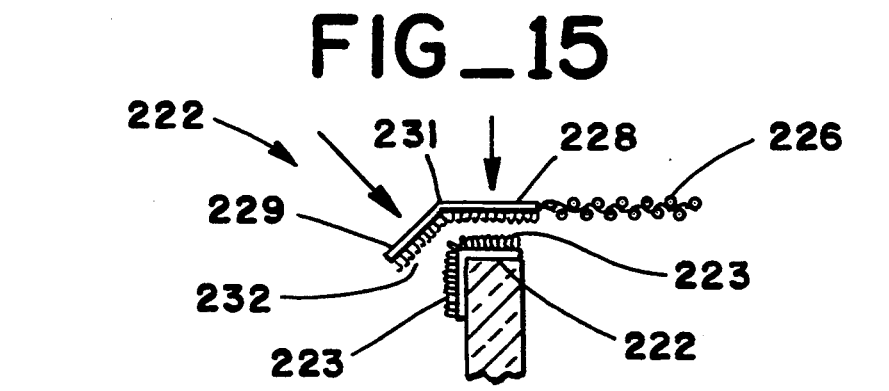
FIG_16

TERRARIUM COVER

REFERENCE TO RELATED APPLICATION

This application is a continuation-in-part of application Ser. No. 08/209,144 filed Mar. 9, 1994.

FIELD OF THE INVENTION

This invention relates generally to a terrarium and, more particularly, to a terrarium which is used with an aquarium to provide an environmental integration between land and water for use by amphibians.

BACKGROUND OF THE INVENTION

Aquarium enthusiasts who keep amphibians, such as for example, turtles and salamanders, desire to provide dry areas onto which the amphibians can climb for air and out-of-water exercise. However, such dry areas provided in aquariums are usually quite small and do not provide enough area for sufficient exercise.

Terrarium enthusiasts who keep amphibians desire to provide deep water areas into which the amphibians can get sufficient in-water exercise. However, terrariums generally only include shallow pools which do not provide the desired deep water environment. One attempt at providing a balanced system for amphibians having a combined water and earth environment is disclosed in U.S. Pat. No. 3,804,064 issued to Juneman, et al. In this device, the surface area of the terrarium is smaller than the surface area of the aquarium. A ramp is required to provide access between the water and land areas. Aesthetically, it does not create a pond environment. There is no provision for bringing the water level up above the top of the existing aquarium and into the terrarium, to create a natural pond environment so that land and water can meet at substantially the same level permitting easy access between land and water for the amphibians.

The foregoing illustrates limitations of the known prior art. Thus, it is apparent that it would be advantageous to provide an alternative directed to overcoming one or more of the limitations as set forth above. Accordingly, a suitable alternative is provided including features and benefits more fully disclosed hereinafter.

SUMMARY OF THE INVENTION

In one aspect of the present invention, this is accomplished by providing a terrarium for mounting atop an open end of an aquarium. The terrarium comprises a multi-sided tank which has a top side including a first opening and a bottom side including a second opening. The top and bottom, sides are spaced apart by an interconnecting sidewall. The bottom side is adapted to be engaged with the open end of the aquarium.

A retainer is engaged with the bottom side for sealingly interconnecting the second opening of the tank with the open end of the aquarium for fluid communication with any water introduced into the aquarium. The retainer includes raised portions extending above the bottom side for permitting the water to be raised to a level extending upwardly into the terrarium above the bottom side. As a result, any terrain features introduced into the terrarium, adjacent the raised portions, are separated from and substantially at the raised water level.

In another aspect of this invention, a cover is provided for an opening formed in a terrarium. The cover comprises a mesh portion having a continuous perimeter and first and second continuous connector strips. The first strip extends along the perimeter of the mesh and is adapted to be matingly connected with the second continuous connector strip mounted on the terrarium adjacent the opening.

In still another aspect of this invention, a multi-sided tank includes a to side and a bottom side spaced apart by an interconnecting transparent sidewall. The top side includes an opening. An aquarium insert is positioned within the tank on the bottom side thereof. The aquarium insert is truncated to form a cross-sectional edge which is positioned in sealing abutment with a portion of the sidewall of the tank. As a result, when a water level is established in the aquarium insert, eye-level viewing into the aquarium insert through the sidewall and below the water level is permitted.

The foregoing and other aspects will become apparent from the following detailed description of the invention when considered in conjunction with the accompanying drawing figures. It is to be expressly understood, however, that the drawings are not intended as a definition of the invention, but are for the purpose of illustration only.

BRIEF DESCRIPTION OF THE DRAWINGS

FIG. 1 is a front elevational view illustrating an embodiment of the terrarium of the present invention mounted atop an open end of an aquarium.

FIG. 2 is an exploded isometric view illustrating an embodiment of the terrarium and retainer means of the present invention for use with an associated aquarium.

FIG. 3 is a cross-sectional view taken along the line 3—3 of FIG. 2, illustrating an embodiment of the sealing engagement between the terrarium of the present invention and an aquarium.

FIG. 4 is an enlarged view illustrating an embodiment of the sealing features of the present invention.

FIG. 5 is a cross-sectional view taken along the line 5—5 of FIG. 2 illustrating an embodiment of the sealing engagement between the terrarium of the present invention and an aquarium.

FIG. 6 is a partial cross-sectional view illustrating a waterfall in combination with an embodiment of the retainer means of the present invention.

FIG. 7 is a partial cross-sectional view illustrating an embodiment of the retainer means of the present invention and an embodiment of a cover for an opening in the top side of the terrarium.

FIG. 7a is an enlarged partial view of an alternate embodiment of the cover and associated connectors of the present invention.

FIG. 8 is a plan view illustrating an embodiment of a contoured retainer means and waterfall combination of the present invention.

FIG. 9 is a cross-sectional view taken along the line 9—9 of FIG. 8 illustrating an embodiment of the waterfall extending into an aquarium.

FIG. 10 is a top plan view illustrating an embodiment of a terrarium including an aquarium insert mounted on the bottom side of the terrarium and having a cross-sectional edge sealingly engaged with the terrarium sidewall.

FIG. 11 is a cross-sectional side view taken along the line 11—11 of FIG. 10, further illustrating the aquarium insert.

FIG. 12 is a partial cross-sectional view taken along the line 12—12 of FIG. 8, further illustrating the contoured retainer means.

FIG. 13 is a top view depicting a further embodiment of the tank cover arrangement shown in FIG. 7a.

FIG. 14 is a side view of the further embodiment shown in FIG. 13.

FIG. 15 is a bottom plan view of the cover used in the embodiment shown in FIGS. 13 and 14.

FIG. 16 is an enlarged, fragmentary cross-sectional elevation showing the engagement of the cover and tank rim of the embodiment shown in FIGS. 13–15.

DETAILED DESCRIPTION OF THE INVENTION

A terrarium generally designated 10 in FIG. 1 is provided for mounting atop an open end 12 of a commercially available aquarium 14. Terrarium 10 is a multi-sided tank preferably formed of a lightweight, transparent synthetic material and includes a top-side 16, and a bottom-side 18, spaced apart by an interconnecting sidewall 20.

As best illustrated in FIG. 2, top-side 16 has a rectangular surface 16a including a rectangular opening 22 formed therein. Bottom-side 18 also has a rectangular surface 18a which is of a larger area than rectangular surface 16a of to-side 16. Also, bottom-side 18 includes an opening 24 formed therein.

Sidewall 20 includes a sloped portion 26 which is inclined at an angle relative to top-side 16 and bottom-side 18 providing a viewing advantage or enhancement into terrarium 10.

Aquarium 14, being commercially available, is well known to be a generally rectangular tank formed of a suitable transparent material and includes a continuous retainer 27, FIGS. 2 and 4, engaged with the open end 12 for the reinforcement of sides 28 of aquarium 14.

Another continuous rectangular retainer 30, having a U-shaped or channel cross-section, is sealingly attached by a suitable adhesive 32 on bottom-side 18 of terrarium 10 for mating engagement with retainer 27 of aquarium 14, best illustrated in FIG. 4. Also, the same suitable sealing adhesive 32 is provided at the abutment surfaces of retainers 27 and 30. In this manner, bottom side 18 is adapted to be sealingly engaged with open end 12 of aquarium 14. Preferably, the sealing adhesive 32 is one such as a commercially available silicone based material which will not chemically break down and contaminate water in aquarium 14.

Means, such as a retainer 34, being a tray-like structure, is best shown in FIG. 2, and includes a horizontally extending planar surface 36, a vertical wall 38 extending upwardly from planar surface 36, and a vertical wall extending downwardly from planar surface 36. Vertical walls 38, 40 each have a substantially smooth surface 38a, 40a, respectively. Vertical wall 40 also defines an opening 41 formed in planar surface 36.

As can be seen from FIGS. 1, 3 and 5, when terrarium 10 is sealingly engaged with aquarium 14, planar surface 36 of retainer 34 abuts bottom-side 18 adjacent opening 24. Surface 36 is sealingly attached to bottom side 18 by adhesive 32, see also FIG. 4. Again, in FIGS. 1, 3 and 5, vertical wall 38 extends upwardly into terrarium 10 above bottom-side 18, and vertical wall 40 extends downwardly through opening 24 and into aquarium 14 below open end 12. In this manner, as is best shown in FIG. 3, water 42 in aquarium 14 is permitted to be raised to a level 44 extending upwardly into terrarium 10 above bottom-side 18. Wall 38 retains water 42 at the raised level 44, separated from any terrain features 46 in terrarium 10 such as soil, gravel or rocks from water 42 and also permits terrain features 46 to be at substantially the same level as water level 44. This permits amphibian access between water 42 and terrain features 46 without the need for a ramp or the like.

Referring now to FIGS. 8, 9 and 12, in another embodiment, retainer 134 is illustrated including a horizontally extending planar surface 136, a contoured wall 138 extending upwardly therefrom and a contoured wall 140 extending downwardly from planar surface 136. Walls 138, 140 have textured surface portions 138a, 140a, respectively, which form a continuous sloping surface 150.

As is best shown in FIG. 12, planar surface 136 is sealing contact with bottom-side 18 by means of adhesive 32. Water 42 in aquarium 14 can be raised to level 44 extending upwardly into terrarium 10 above bottom-side 18. Wall 138 retains water 42 at the raised level 44, separates terrain features 46 from water 42 and also permits terrain features 46 to be at substantially the same level as water level 44. This embodiment also permits amphibian access between water 42 and terrain features 46 without the need for a ramp. Furthermore, continuous sloping surface 150, including textured surface portion 140a being submerged below water level 44 and portion 138a in contact with terrain features 46, permits an aesthetically pleasing barrier between water and terrain and further eases amphibian access to either water or terrain.

Adhesive 32 is also used between ends 135 of retainers 134 and sidewall 20 of terrarium 10, see FIG. 8. As a result, water 42 is retained in the area between both retainers 134 and sidewall 20 adjacent opening 24. Terrain features 46 are retained in the areas between either of the retainers 134 and sidewall 20.

Referring to FIG. 6, a waterfall member 51 is cooperatively mounted with retainer 34 in terrarium 10. The waterfall member 51 includes a first end 52 submerged in water 42 and a second end 54 elevated in the terrarium 10 with respect to first end 52. Waterfall member 51 includes a contoured surface 56 sloping upwardly from first end 52 to elevated end 54. A plurality of horizontally disposed baffles 58 are arranged in a spaced apart sequential array on surface 56. Gravel 60 is provided on each baffle 58.

Means such as a tube 62 is provided with an inlet 64 submerged with an inlet 64 submerged in water 42 adjacent first end 52 and an outlet 66 adjacent the elevated second end 54. An air inlet 68 is also provided in tube 62. Air inlet 68 exists terrarium 10 via bottom-side 18. Power from a well known external source, not shown, is provided to pump water 42 from inlet 64 to outlet 66 so that the water conducted to outlet 66 is permitted to flow over the baffles 58 and gravel 60 and return to the aquarium 14. As the water cascades over the gravel 60, a biological filter is created.

A surface 70 of waterfall 51 engages sidewall 20 and a surface 72 of waterfall 51 engages vertical wall 38 of retainer 34. An aperture 74 formed in vertical wall 38 permits tube 62 to extend therethrough. Sealing adhesive 32 is added to seal tube 62 in aperture 74.

In another embodiment, FIG. 9, waterfall 151 is cooperatively mounted between retainers 134, see also FIG. 8. Tube 162 is provided with an inlet 164 submerged in water 42 adjacent first end 15 and an outlet 166 adjacent elevated second end 154. Air inlet 168 is also provided in tube 162. Air inlet 168 exists terrarium 10 via bottom-side 18. Inlet 164 is submerged in water 42 adjacent first end 152 via an aperture 174. A surface 170 of waterfall 151 engages sidewall 20 and a surface 172 of waterfall 151 engages bottom-side 18. Sealing adhesive 32 is added to seal tube 162 in aperture 174. Other features of waterfall 151 are structurally and functionally similar to waterfall 51 as set forth above.

In the embodiments of FIGS. 10 and 11, aquarium 14 functions as a terrarium illustrated in combination with a pond insert 301. Aquarium 14 comprises a multi-sided tank having transparent sides 28, an open end 12 including a retainer 27, and a bottom-side 29. Pond insert 301 is positioned within aquarium 14 on bottom-side 29. Insert 301 is truncated to form a cross-sectional edge 301a. The edge 301a is positioned in sealing abutment with ne of the sides 28 by means of adhesive 32. A water level 44 is established in insert 301 and terrain features 46 are established in aquarium 14 at substantially the same level as water 44. The water 42 and terrain features 46 are maintained separated by an edge portion 301b of insert 301. Advantageously, this permits eye-level viewing into water 42 below water level 44 directly through side 28 as illustrated by the eye level line designated E in FIG. 11. The substantially same levels of water and terrain features also permit easy land and water access for amphibians without the need for a ramp.

Referring now to FIG. 7, a cover 200 is illustrated for covering opening 22 formed in top-side 16 of the terrarium 10. Cover 200 includes a mesh portion 201 formed of fiberglass, nylon or the like having a perimeter 203. A connector strip 204, formed of hook and loop fastener material, such as VELCRO or the like, is attached to extend along perimeter 203. Another connector strip 202 is mounted on top side 16. As a result, strips 202 and 204 can be matingly connected to retain cover 200 positioned over opening 22.

In another embodiment, FIG. 7a, for use with a tank 210 such as an aquarium or terrarium, a connector strip 202a is mounted in folded engagement with at least two surface portions of tank 210. Connector strip 204a is attached to perimeter 203a of mesh 201a and includes a fold flap 204b adapted to be folded in contoured mating engagement with folded connector strip 202a.

With regard to FIGS. 13 and 14, a tank 220 for use as a terrarium or aquarium includes sidewalls defining a coffer-like container 221. The sidewalls may be configured as a rectangular enclosure, as shown in the figures, or may comprise any other convenient or desirable shape. At the continuous upper rim 222 of the tank 220, a continuous strip 223 of fabric connector (hook and loop connector) material is secured to the entire upper rim surface as well as the adjacent upper side surfaces of the tank. The strip 223 may be secured directly to the tank surfaces, or may be secured to a frame that is matingly secured to the upper rim portion of the tank, as shown in FIG. 7a.

A tank cover 225, shown in FIG. 15, includes a mesh portion 226 formed of fiberglass, wire, nylon, or other polymer material. The mesh portion 226 is dimensioned to cover substantially the entire coffer opening 221. Secured to the perimeter of the mesh portion 226 is a connector frame 227 dimensioned to be secured to the upper rim 222 of the tank 220. The connector frame 227 includes a continuous strip 228 of fabric fastener (hook and loop) material, the strip 228 being disposed in the plane of the mesh portion 226 and extending continuously about the perimeter of the mesh portion. Extending from the strip 228 is a plurality of side tabs 229, one for each side of the tank 220. The tabs 229 are joined to the strips 228 along respective crease lines 231, so that each tab 229 may be rotated out of the plane of the strip 228 and mesh 226. The bottom surfaces of the strip 228 and the tabs 229 are provided with hook and loop connector material 232 extending continuously therealong. The cover 225 may be releasably secured to the open coffer 221 by placing the cover atop the tank 220, and aligning the strip 228 with the upper rim 222 of the tank. The strip 228 is pressed onto the rim 222, and the tabs 229 are folded down onto the adjacent side portions 223 of hook and loop fastening material. The hook and loop materials 232 and 223 engage and mate to form a connection extending continuously about the rim and upper sides of the tank, thus securing the cover 225 very firmly and preventing removal by any creature within the tank. However, the cover may be easily removed by manual effort by peeling away the tabs 229 from the upper side portions of the tank, and then peeling the strip 228 away from the upper rim of the tank. Thus the tank 220 may be enclosed to prevent escape of any inhabitants (or intrusion by any creatures), without hindering opening of the tank by a caretaker when required.

From the foregoing, it can be appreciated that the benefits and features of the invention disclosed herein are many. A terrarium is provided to rest atop a standard aquarium to provide a unique environmental integration for amphibians.

Land and water separation are accomplished at the same levels for easy ingress and egress of amphibians without the need for a ramp. This is accomplished by a separator which seals the water from the terrain and permits water in an aquarium to be raised above the existing aquarium height to the level of terrain features in the top mounted terrarium, thus creating a true, natural pond environment.

A waterfall, which is aesthetically pleasing, also serves to act as a biological filter for the cascading water. A cover which is easily replaced and removed provides a secure seal to resist unwanted penetration by the terrarium inhabitants.

While this invention has been illustrated and described in accordance with the preferred embodiment, it is recognized that variations and changes may be made therein without departing from the invention as set forth in the claims.

I claim:

1. A cover arrangement in combination with an opening formed in a tank, including;
    a mesh portion having a continuous perimeter;
    a first member extending continuously about said perimeter of said mesh portion;
    a second member extending continuously about said opening, said first and second members being configured for mutual continuous engagement; and
    hook and loop fastener means for joining said first and second members.

2. The cover arrangement of claim 1, wherein said opening in said tank includes a rim extending continuously about said opening, said rim having a continuous upper rim surface, and said second member includes one portion extending continuously about said upper rim surface.

3. The cover arrangement of claim 2, wherein said first member includes a continuous strip disposed to engage said one portion of said second member.

4. The cover arrangement of claim 3, wherein said tank includes contiguous sides extending from said rim, and said second member includes another portion extending continuously about said contiguous sides adjacent to said rim.

5. The cover arrangement of claim 4, wherein said first member includes a plurality of tabs extending from said continuous strip, said tabs disposed to engage said another portion of said second member.

6. A cover arrangement in combination with an opening formed in a tank, including;
- a mesh portion having a continuous perimeter;
- a first member extending continuously about said perimeter of said mesh portion;
- a second member extending continuously about said opening, said first and second members being configured for mutual continuous engagement;
- hook and loop fastener means for joining said first and second members;
- said opening in said tank including a rim extending continuously about said opening, said rim having a continuous upper rim surface, and said second member including one portion extending continuously about said upper rim surface;
- said first member including a continuous strip disposed to engage said one portion of said second member;
- said tank including contiguous sides extending from said rim, and said second member including another portion extending continuously about said contiguous sides adjacent to said rim;
- said first member including a plurality of tabs extending from said continuous strip, said tabs disposed to engage said another portion of said second member;
- wherein each of said tabs are joined to said continuous strip along a crease line to permit folding of each tab with respect to said continuous strip along a respective crease line.

* * * * *